United States Patent [19]

Acquaviva

[11] Patent Number: 5,331,376
[45] Date of Patent: Jul. 19, 1994

[54] SYSTEM AND METHOD FOR EDITING A DOCUMENT IMAGE

[75] Inventor: Thomas Acquaviva, Penfield, N.Y.

[73] Assignee: Xerox Corporation, Stamford, Conn.

[21] Appl. No.: 990,845

[22] Filed: Dec. 14, 1992

[51] Int. Cl.5 .......................................... G03G 21/00
[52] U.S. Cl. .................................. 355/202; 355/218; 355/308; 358/452; 358/478
[58] Field of Search ............... 355/77, 218, 244, 308, 355/309, 316, 200, 202; 358/452, 478, 296, 300, 453

[56] References Cited

U.S. PATENT DOCUMENTS

| | | | |
|---|---|---|---|
| 4,503,468 | 3/1985 | Serinken | 358/452 |
| 4,627,707 | 12/1986 | Tani et al. | 355/218 |
| 4,771,336 | 9/1988 | Ohtorii | 358/452 |
| 4,796,052 | 1/1989 | Mizutani et al. | 355/218 |
| 4,887,129 | 12/1989 | Shenoy et al. | |
| 4,992,828 | 2/1991 | Liston | 355/202 |
| 5,019,865 | 5/1991 | Tanaka et al. | 355/218 |
| 5,120,039 | 6/1992 | Yamada | 355/308 X |
| 5,134,440 | 7/1992 | Nishimori | 355/218 |
| 5,153,737 | 10/1992 | Kobayashi | 358/452 X |
| 5,187,587 | 2/1993 | Farrell et al. | 358/296 |

*Primary Examiner*—A. T. Grimley
*Assistant Examiner*—Sandra L. Brasé
*Attorney, Agent, or Firm*—Finnegan, Henderson, Farabow, Garrett & Dunner

[57] ABSTRACT

A system and method of designating edit information for an original document. The system includes a mechanism for designating a location on the original document while the document is in a document feeder tray. The mechanism does not deface the original document.

31 Claims, 6 Drawing Sheets

SYSTEM AND METHOD FOR EDITING A DOCUMENT IMAGE

BACKGROUND OF THE INVENTION

1. Field of the Invention

The present invention relates to system and method for editing a document image, and more particularly to a system and method for designating edit information for a document in the document handling mechanism of a printing apparatus.

2. Discussion of the Related Art

Certain types of printers are capable of producing an altered copy of an original document, as well as an identical copy of the original document. In order to define an area to be altered, coordinates on the document must be specified. One method of specifying coordinates employs a special color pen. A user may draw an area on an original document and the printer then detects an area defined by dye from the special color pen. A disadvantage of this method is that it defaces the original document or requires the making of a copy of the original for marking with the special color pen. Copying a copy results in an image of less than optimum quality and involves additional manual steps.

Another method of specifying coordinates employs an edit pad. For example, the NP 3525 Copier manufactured by the Canon Corporation employs an edit pad that allows selected area on a document to be colored, highlighted or deleted. The disadvantage of the traditional edit pad method is that manual steps may be required to separate an original document from other documents and place the separated document on the edit pad.

ADVANTAGES AND SUMMARY OF THE INVENTION

It is an advantage of the invention to provide a system and method of designating edit information that reduces a required amount of manual steps and that does not deface an original of a document image to be altered.

To achieve this and other advantages of the invention, a system for processing documents comprises means for receiving a stack of documents; means for designating a location on a document in the receiving means, without defacing the document; means for scanning the document; and means for transporting the document from the receiving means to the scanning means.

According to another aspect of the present invention, a system for processing documents comprises means for receiving a stack of documents; means for designating a location on a document in the receiving means, without defacing the document, and for generating a first signal representing the location on the document; means for scanning the document to generate a second signal representing an image of the document; means, responsive to the first and second signals, for generating a signal representing an altered image of the document; and means for transporting the document from the receiving means to the scanning means.

According to another aspect of the present invention, a method of operating a system for processing documents comprises the steps of receiving a stack of documents; receiving a designated location on a document in the received stack of documents, without defacing the document; transporting the document from the stack of documents; and scanning the document.

The accompanying drawings, which are incorporated in and which constitute a part of this specification, illustrate one embodiment of the invention and, together with the description, explain the principles of the invention.

DESCRIPTION OF THE PREFERRED EMBODIMENT

Figure 1:
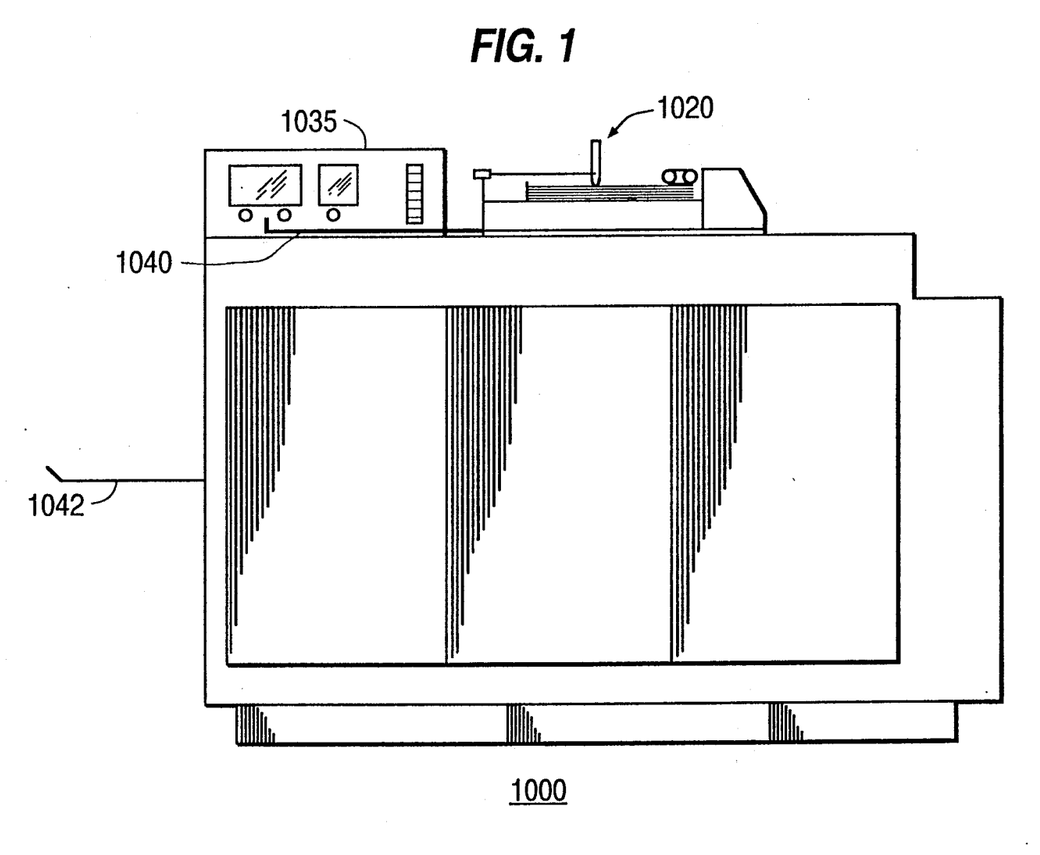
FIG. 1 is an illustration of a preferred copier image according to an embodiment of the present invention.

FIG. 1 shows an electrophotographic copier 1000 for reproducing copies and for producing altered copies without defacing an original document. Document feeder 1020 includes a coordinate entry mechanism and a paper feed tray. Coordinates on an original document are specified at document feeder 1020, the document is transported to an imaging position on copier 1000, and then transported to document restacking tray 1040. A copy of the original document is transported to output paper stacker 1042.

Document feeder 1020 typically operates in a collating mode, wherein original documents are fed from the top of a stack to the scanner one at a time. The original documents are placed into document feeder 1020 in a certain order. The first page is on top of the stack and the last page is at the bottom of the stack. An operator can control the operation of copier 1000 through operator control panel 1035 and through the coordinate entry mechanism of document feeder 1020, as described in more detail below.

Figure 2:
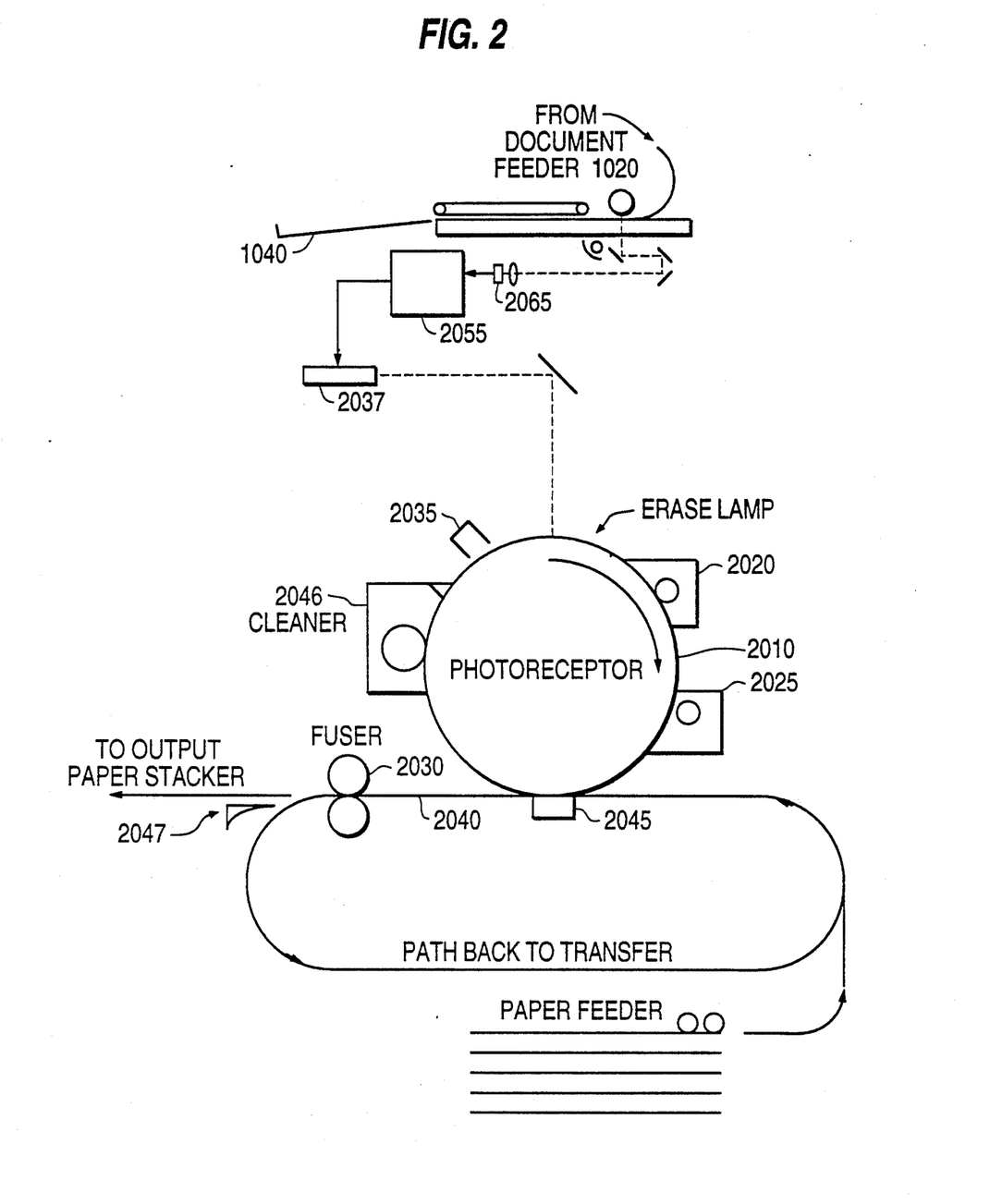
FIG. 2 is a diagram showing the printing mechanism of the preferred copier shown in FIG. 1.

FIG. 2 shows a copying mechanism inside copier 1000. Light reflected from the document is reflected off mirrors and passes through a lens to charge coupled device (CCD) 2035, which converts the light into an electrical signal that is processed by controller 2055. Controller 2055 controls laser 2037. Drum 2010 has a photoconductive surface on a conductive substrate. Drum 2010 advances successive portions of the photoconductive surface to various processing stations disposed around the path of movement of drum 2010. More specifically, a portion of drum 2010 passes charging station 2035, which includes a corona generating device that charges the photoconductive surface of drum 2010 to a relatively high, substantially uniform potential. Subsequently, the charged portion of the photoconductive surface passes a light beam originating from laser 2037, which exposes the photoconductive surface based on a signal received from CCD 2035.

These light rays selectively dissipate the charge on the photoconductive surface, thereby recording an electrostatic latent image, corresponding to a document from input section 1020, on the photoconductive surface.

Subsequently, to erase a selected portion of the original document image, laser 2037 exposes the entire corresponding area of the photoconductive surface.

After the electrostatic latent image is recorded on the photoconductive surface, drum 2010 passes development station 2020. At development station 2020, a magnetic brush development system transports a developer mixture of carrier granules and black toner particles into contact with the electrostatic latent image recorded on the photoconductive surface. The toner particles are attracted from the carrier granules to the electrostatic latent image, thereby forming a toner powder image on the photoconductive surface of drum 2010.

Development station 2025 is similar to development station 2020, except that developing station 2025 contains toner particles of a selected color, thereby allowing a copy to be reproduced in a desired color other than black or have portions thereof color highlighted.

After development, drum 2010 advances the toner powder image to transfer station 2045, which includes a corona generating device. At the transfer station 2045, a copy sheet is moved in contact with the toner powder image. The corona generating device sprays ions onto the backside of the copy sheet to attract the toner powder image from the photoconductive surface to the copy sheet. After transfer, the copy sheet moves to fusing station 2030, which permanently affixes the transferred toner powder image to the copy sheet with heat and pressure.

After fusing, the copy sheet is driven to decision gate 2047, which directs the copy sheet either to output paper stacker 1042, or to a return path for additional processing at transfer station 2045 to add edited information. Cleaner 2046 removes excess toner from drum 2010.

Figure 3:
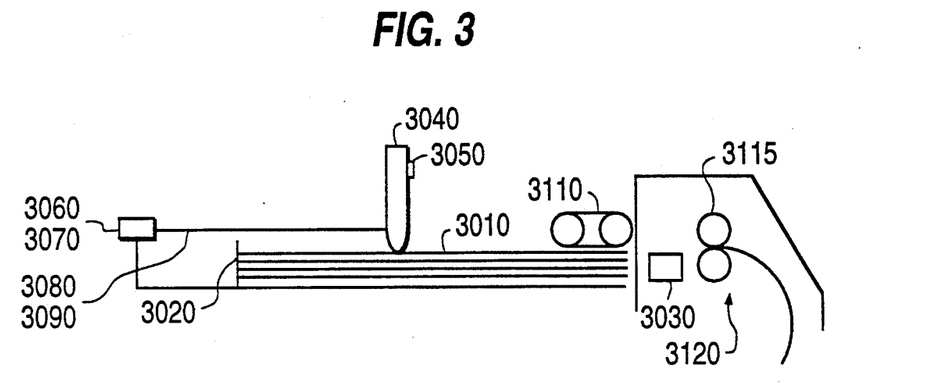
FIG. 3 is a diagram showing the coordinate entry assembly of the preferred copier shown in FIG. 1.

FIG. 3 shows input section 1020, which constitutes a portion of the document handling mechanism of copier 1000. Original documents 3010 are Juxtaposed to rear guide 3020, which can be moved to accommodate originals of various sizes. Air knife 3030 pushes originals 3010 against rear guide 3020 with an air stream. Markerless pen 3040, including push button switch 3050, can be moved to various positions on the top most of documents 3010, to designate a coordinate on the top most document. Pen 3040 is coupled to take up rollers 3060 and 3070 via cables 3090 and 3080, as described in more detail below. Take up rollers and 3070 operate to anchor cables 3090 and 3080, respectively. Wires extend from pen 3040 through the cables 3080 and 3090 to controller.

Vacuum feed head 3110 operates to transport a document to document scan position, by propelling the top most original document through roller pair 3115 and around paper path 3120 of the preferred document feeder.

Figure 4:
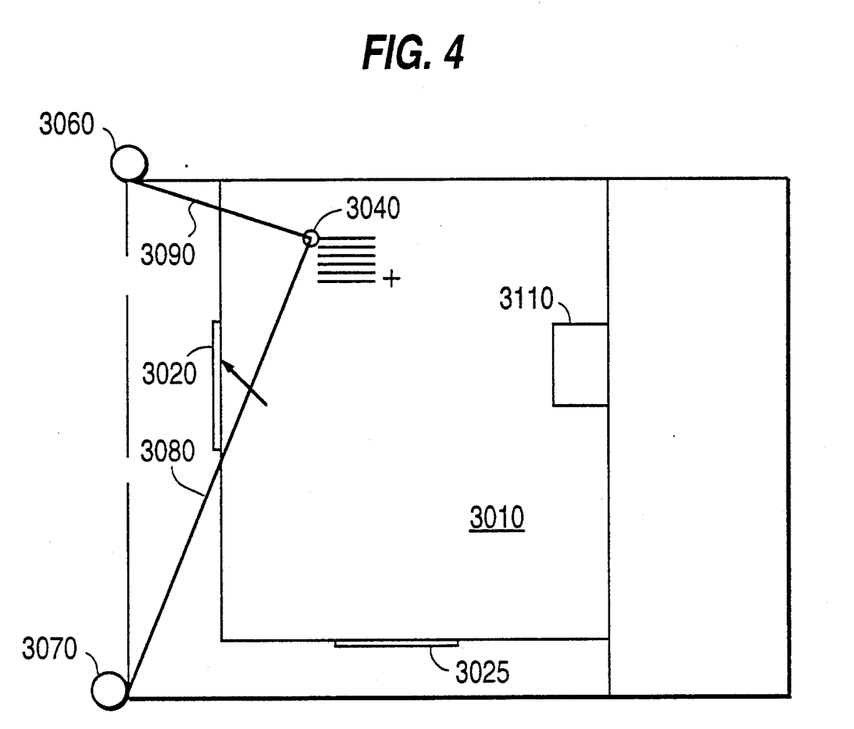
FIG. 4 is another diagram of the coordinate entry assembly of the preferred copier shown in FIG. 1.

FIG. 4 shows a plan view of document feeder 1020. Length guide 3025 cooperates with rear guide 3020 to position originals 3010. Pen 3040 is attached to take up roll 3060 via cable 3090, and is attached to take up roll 3070 via cable 3080.

Figures 5, 6, 9:
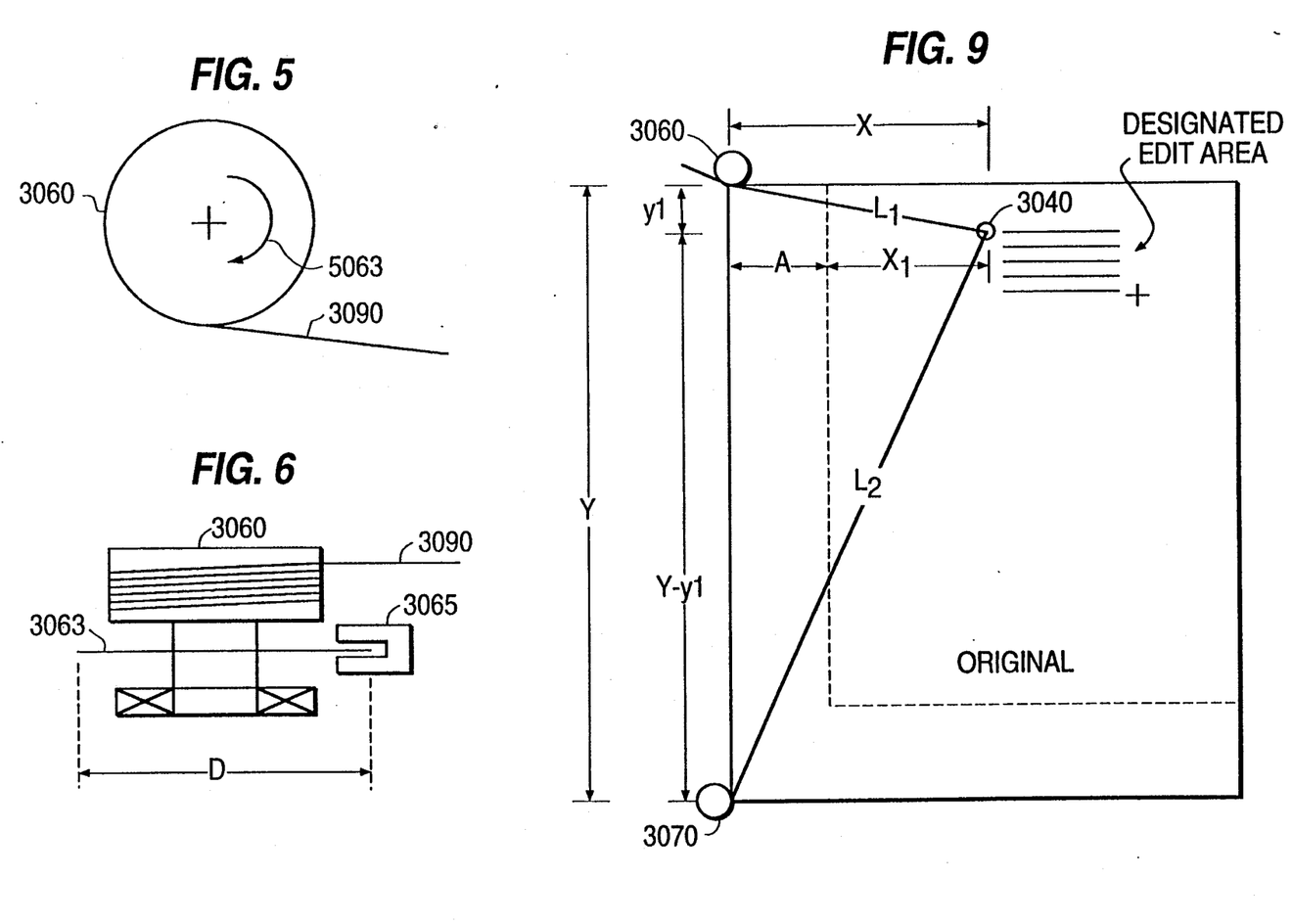
FIG. 5 is a diagram showing a portion of the assembly shown in FIG. 4 in more detail.
FIG. 6 is another diagram showing a portion of the assembly shown in FIG. 4 in more detail.
FIG. 9 is another diagram of the coordinate entry assembly of the preferred copier shown in FIG. 1.

FIG. 5 shows a top view of take up roll 3060 and cable 3090. Take up roll 3060 is applied with a biasing torque in a direction of arrow 5063 to keep cable 3090 taut. Take up roll 3070 and cable 3080 are coupled in a similar manner to the coupling of take up roll 3060 and cable 3090.

FIG. 6 shows a side view of take up roll 3060, encoder disc 3063 and sensor housing 3065. Sensor housing 3065 includes two sensors, each of which detects marks on encoder disc 3063. Each sensor sends a signal to controller 2035 when a sensor encounters a mark. The marks are arranged on disc 3063 to define a circle having a diameter D centered around an axis of take up roll 3060.

Thus, take up roll 3060 and sensor housing 3065 operate to generate a signal to indicate a change in a length of the cable extending from take up roll 3060 to pen 3040.

Figure 7:
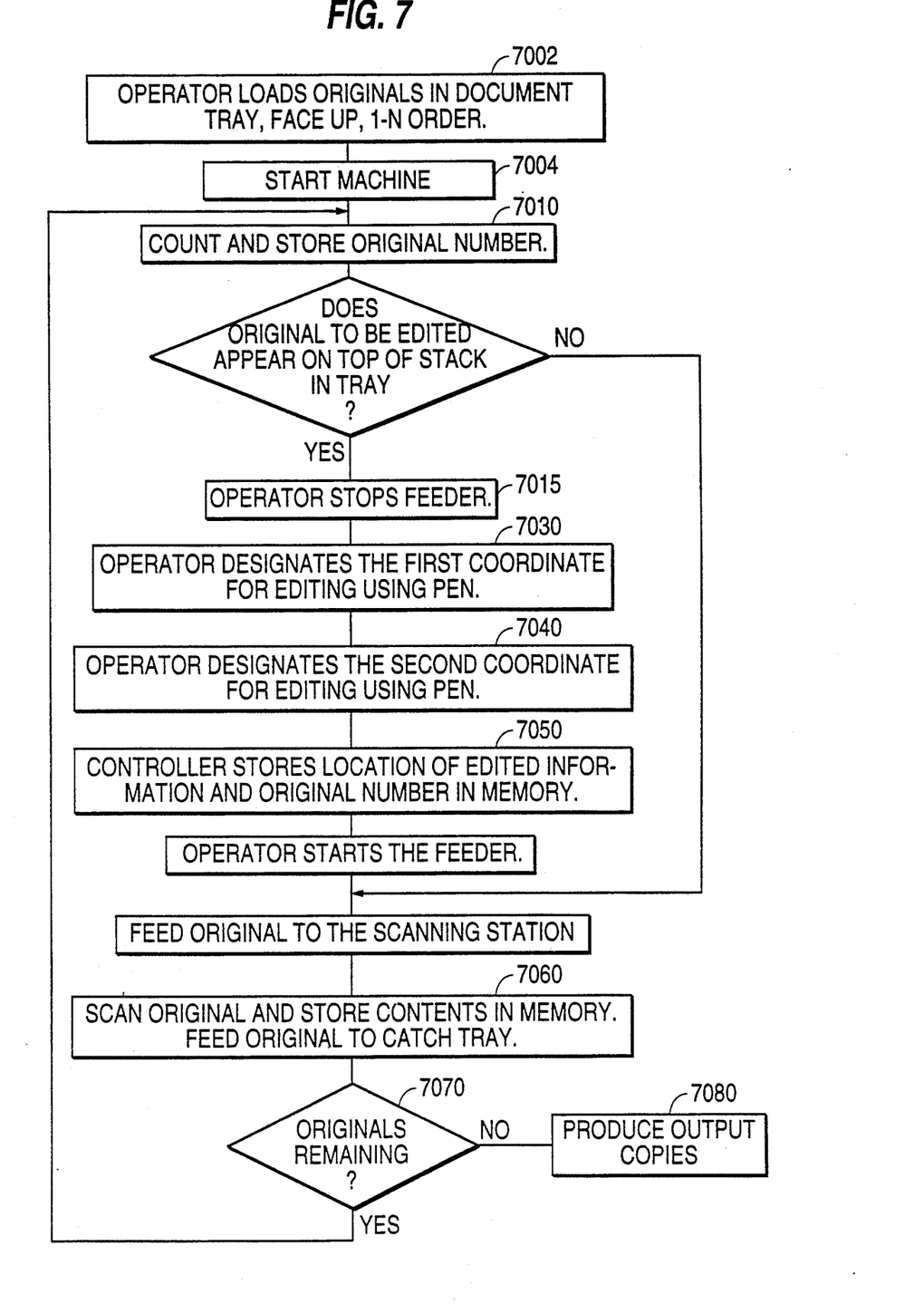
FIG. 7 is a flow diagram illustrating an operation of the preferred printing system of the present invention.

FIG. 7 shows processing steps of preferred copier 1000. After an operator has loaded a stack of originals into the tray (step 7002), the operator starts the machine (step 7004). A number for the original document is generated, by incrementing a counter, and the number is stored in a memory in controller 2055. (step 7010) If the operator decides that the original to be edited is at the top of the stack, the operator stops the machine (step 7015). Copier 1000 accepts two sets of X-Y coordinates of a location of pen 3040 (steps 7030 and 7040), and stores the two coordinates into a memory (step 7050). More specifically, when the operator positions the stylus pen at the desired location on the original, the operator presses button 3050 to close a switch on pen 3040. This switch closure is sensed by software in controller 2055 as a signal that the pen is at the designated location.

An alternative mechanism for indicating that pen 3040 is at the desired location would be for the operator to press a button on control panel 1035, thus avoiding the need to have wires extending through the cable and also simplifying the structure of pen 3040.

If the operator wishes to designate a coordinate that is under feed head 3110, the operator may temporarily lift feed head 3110 off of the original document.

The document feeder then feeds the top most original document and copier 1000, scans the original document and stores the document image into a memory (step 7060). The original document is then fed face-down to document restacking tray 1040. Copier 000 determines whether there are originals remaining in the tray (step 7070) and repeats steps 7010–7060 if there are originals remaining in the tray. Otherwise, copier 1000 produces output documents based on the documents scanned in steps 7010–7060 (step 7080).

During the processing of FIG. 7, the operator may use control panel 1035, which has buttons allowing the entering of commands to define an operation, such as color highlighting, to be perforated on an image of an original document.

Figure 8:
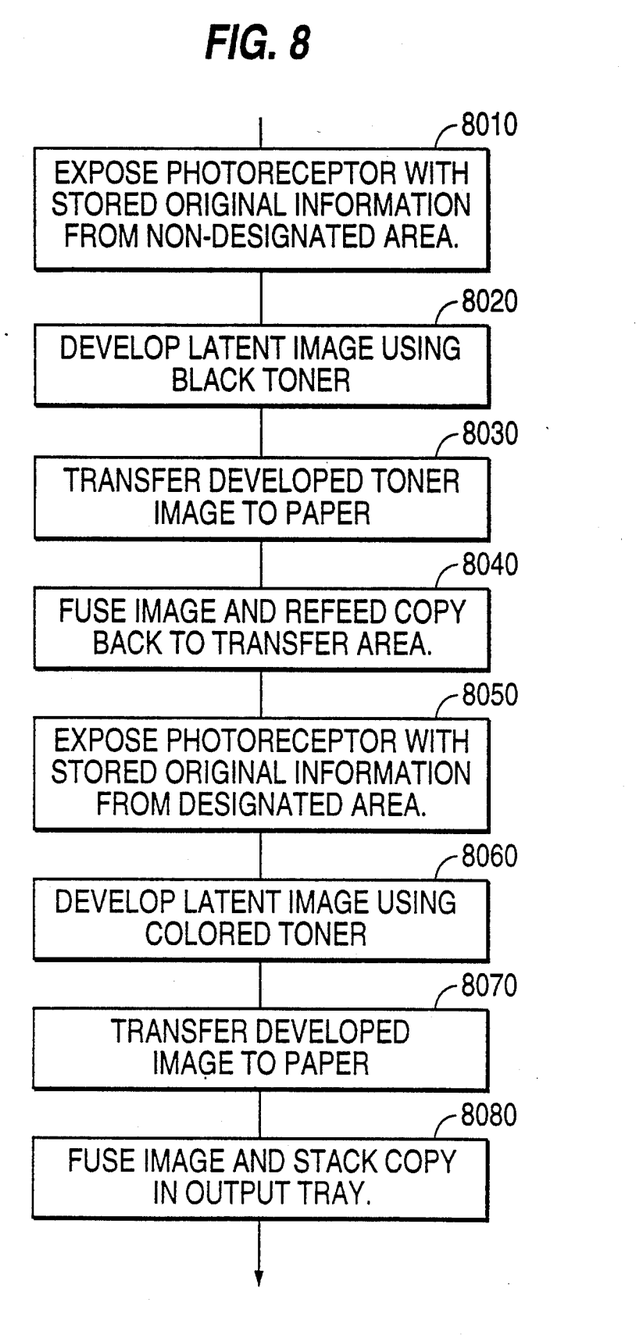
FIG. 8 is a flow diagram for explaining a step of the processing shown in FIG. 7 in more detail.

FIG. 8 shows a diagram of a processing of step 7080 in more detail. The steps shown in FIG. 8 are performed for each original requiring color editing. First, laser 2037 exposes an area on photoreceptor 2010 in accordance with stored original information from areas outside of an area designated by the operator with pen 3040 (step 8010). Black developer 2020 deposits black toner on photoreceptor 2010 (step 8020) and the black toner is transferred to paper (step 8030). Fuser 2030 fuses the toner to the paper and transport 2040 recirculates the paper back to photoreceptor 2010 (step 8040). The area on photoreceptor 2010 is cleaned and recharged by cleaner 2046 and charging device 2035. Laser 2037 then exposes photoreceptor in accordance with information from the area designated by the operator with pen 3040 (step 8050). Color developer 2025 deposits color toner on photoreceptor 2010 (step 8060) and the toner is transferred to the paper (step 8070). Fuser 2030 fuses the colored toner to the paper and the paper is then transferred to output paper stack 1040 (step 8080).

FIG. 9 shows a plan view of document feeder 1020 for explaining step 7030, of accepting a coordinate, in more detail. As shown in FIG. 9, a coordinate on the original document is specified by a horizontal dimension $x_1$ and a vertical dimension $y_1$ relative to a fixed datum in the paper tray. The dimensions $x_1$ and $y_1$ can be determined from a length $L_1$ of cable 3080 extending from take up roll 3060, and a length $L_2$ of cable 3090 extending from take up roll 3070, and from dimensions Y and A shown in FIG. 9. More specifically:

$$L_1^2 = x^2 + y_1^2$$

$$L_2^2 = x^2 + (Y - y_1)^2$$

$$L_1^2 - L_2^2 = y_1^2 - (Y^2 - 2Yy_1 + y_1^2)$$

$$L_1^2 - L_2^2 = y_1^2 - Y^2 + 2Yy_1 - y_1^2$$

$$y_1 = \frac{L_1^2 - L_2^2 + Y^2}{2Y}$$

Because one revolution of the encoder disc $= \pi D = N$ encoder marks, $$L = \frac{\pi D n}{N},$$

where n = # encoder marks sensed on each disk.

$$y_1 = \frac{\frac{(\pi D n_1)^2}{N^2} - \frac{(\pi D n_2)^2}{N^2} + Y^2}{2Y},$$

$$x = [(\pi D n_1)^2/N^2 - (y_1)^2]^{\frac{1}{2}}$$

The coordinates of the edit locations relative to the trail edge of the document are: $y = y_1$, $x_1 = x - A$, where A is the distance from the rear of the stack to the x y datum as measured by a sensor on the rear stack guide (not shown).

The resolution of the coordinate sensor described above is influenced by the number n of encoder marks on disc 3063 and by the diameter D defined by the encoder marks. For example, assume the encoder disks are 2 inches in diameter, encoder marks are 2° apart (N=180), Y=12 inches, A=2.0 inches, $N_1$=200 marks, $N_2$=350 marks. With these parameters, an incremental change of one mark in $N_1$ gives a resolution in the Y direction of +0.01 inches and −0.02 inches; and a resolution in the X direction of =0.04 inches and +0.04 inches.

Controller 2055 is capable of distinguishing between clockwise and counterclockwise movements of take up roller 3060, because sensor housing 3065 includes two sensors for detecting the presence of a mark at two respective locations along the diameter D. A distance between the two locations is less than the pitch between two marks along the diameter. Two sequential detections of a mark by one of the sensors without an intervening detection of a mark by the other sensor indicates a change in rotation direction of roller 3060. Thus, sensor housing 3065 operates to generate a signal to indicate a change in a length of cable 3080 extending from roller 3060 to pen 3040.

Thus, the preferred embodiment of the present invention provides a method of designating an area on an original document without defacing the document and without requiring manual steps to separate a document to be edited from a stack of documents being processed by a copier.

Other types of editing may be performed, such as editing to remove text from the original, to add prestored information such as a stamp indicating "CONFIDENTIAL", or to move information in the document.

Although the preferred paper feeder feeds the topmost sheet of paper in the stack, the invention may be practiced with a paper feeder that feeds the bottom-most sheet of paper and recirculating each original through the paper feeder.

Although the preferred embodiment employs cables to determine a location of a stylus, the invention may be practiced with another method for determining the location of the stylus, such as detecting acoustic energy emitted by the stylus. An acoustic method could operate according to principles similar to those of the preferred embodiment, by employing a circuit, responsive to a distance of the stylus from a first reference location, for generating a first signal; a second circuit, responsive to another distance of the stylus from a second reference location, for generating a second signal; and a third circuit, responsive to the first and second signals, for generating a signal representing a location of the stylus.

Additional advantages and modifications will readily occur to those skilled in the art. The invention in its broader aspects is therefore not limited to the specific details, representative apparatus, and illustrative examples shown and described. It is intended that the present invention cover the modifications and variations provided they come within the scope of the appended claims and their equivalents.

We claim:

1. A system for processing documents, the system comprising:
    means for receiving a stack of documents;
    means for designating a location on a document while the document is in the receiving means, without defacing the document;
    means for scanning the document; and
    means for transporting the document from the receiving means to the scanning means.

2. The system according to claim 1, wherein the transporting means includes means for transporting a top-most one of the documents.

3. The system according to claim 1, wherein the means for designating a location includes
    a stylus.

4. The system according to claim 1, wherein the means for designating a location includes
    a stylus movable to a stylus location;
    means, responsive to a distance of the stylus location from a first reference location, for generating a first signal;
    means, responsive to another distance of the stylus location from a second reference location, for generating a second signal; and
    means, responsive to the first and second signals, for generating a signal representing a location of the stylus.

5. A system according to claim 1, further including means for entering commands defining an operation to be performed on an image of the document.

6. A system according to claim 1, further including electrophotographic printing means, responsive to the scanning means.

7. The system according to claim 1, wherein the means for designating a location includes
- a stylus;
- first anchor means;
- first cable means having an end coupled to the first anchor means and another end coupled to the stylus;
- second anchor means; and
- second cable means having an end coupled to the second anchor means and another end coupled to the stylus, wherein the first anchor means generates a first signal to indicate a change in a length of the first cable means extending from the first anchor means to the stylus and the second anchor means generates a second signal to indicate a change in the length of the second cable means from the second anchor means to the stylus.

8. A system for processing documents, the system comprising:
- means for receiving a stack of documents;
- means for designating a location on a document while the document is in the receiving means, without defacing the document, and for generating a first signal representing the location on the document;
- means for scanning the document to generate a second signal representing an image of the document;
- means, responsive to the first and second signals, for generating a signal representing an altered image of the document; and
- means for transporting the document form the receiving means to the scanning means.

9. The system according to claim 8, wherein the means for designating a location includes
- a stylus movable to a stylus location;
- means, responsive to a distance of the stylus location from a first reference location, for generating a first signal;
- means, responsive to another distance of the stylus location from a second reference location, for generating a second signal; and
- means, responsive to the first and second signals, for generating a signal representing a location of the stylus.

10. A method of operating a system for processing documents, the method comprising the steps of:
- receiving a stack of documents;
- receiving a designated location on a document while the document is in the received stack of documents, without defacing the document;
- transporting the document from the stack of documents; and
- scanning the documents.

11. The method according to claim 10, wherein the transporting step includes the substep of transporting a top-most one of the documents.

12. The method according to claim 10, wherein the transporting step includes the substep of transporting a bottom-most one of the documents.

13. The method according to claim 10, wherein the receiving step includes the substep of receiving a location of a stylus.

14. The method according to claim 10, wherein the system includes a stylus and the receiving step includes the substep of:
- generating a first signal, responsive to a distance of a location of the stylus from a first reference location;
- generating a second signal, responsive to another distance of the location of the stylus from a second reference location; and
- generating a signal representing a location of the stylus, responsive to the first and second signals.

15. A method according to claim 10, further including the step of receiving a command defining an operation to be performed at the designated location.

16. A method according to claim 10, further including the step of electrophotographic printing responsive to the scanning step.

17. A method of processing documents, the method comprising the step of:
- receiving a stack of documents;
- receiving a designated location on a document while the document is in the stack of documents, without defacing the document, and generating a first signal representing the location on the document;
- scanning the document to generate a second signal representing an image of the document;
- generating, responsive to the first and second signals, a signal representing an altered image of the document; and
- transporting the document from the stack of documents to the scanning means.

18. The method according to claim 17, wherein the system includes a stylus the receiving step includes
- generating a first signal, responsive to a distance of a location of the stylus from a first reference location;
- generating a second signal, responsive to another distance of the location of the stylus from a second reference location; and
- generating a signal representing a location of the stylus, responsive to the first and second signals.

19. A system for processing documents, the system comprising:
- means for receiving a stack of documents;
- means for scanning a document;
- means for transporting each document from the receiving means to the scanning means; and
- means for stopping the transporting means and designating a location on a document while the document is the receiving means, without defacing the document.

20. The system according to claim 19, wherein the transporting means includes means for transporting a top-most one of the documents.

21. The system according to claim 19, wherein the means for designating a location includes
- a stylus.

22. The system according to claim 19, wherein the means for designating a location includes
- a stylus movable to a stylus location;
- means, responsive to a distance of the stylus location from a first reference location, for generating a first signal;
- means, responsive to another distance of the stylus location from a second reference location, for generating a second signal; and means, responsive to the first and second signals, for generating a signal representing a location of the stylus.

23. The system according to claim 19, wherein the means for designating a location includes
a stylus;
first anchor means;
first cable means having an end coupled to the first anchor means and another end coupled to the stylus;
second anchor means; and
second cable means having an end coupled to the second anchor means and another end coupled to the stylus, wherein the first anchor means generates a first signal to indicate a change in a length of the first cable means extending from the first anchor means to the stylus and the second anchor means generates a second signal to indicate a change in the length of the second cable means from the second anchor means to the stylus.

24. A system according to claim 19, further including means for entering commands defining an operation to be performed on an image of the document.

25. A system according to claim 19, further including electrophotographic printing means, responsive to the scanning means.

26. A system for processing documents, the system comprising:
means for receiving a stack of documents;
means for scanning a document to generate an image signal representing an image of the document;
means for transporting a document from the receiving means to the scanning means;
means for stopping the transporting means and designating a on a document while the document is in the receiving without defacing the document, and for generating a location signal representing the location on the document;
means, responsive to the image and location signals, for generating a signal representing an altered image of the document.

27. The system according to claim 26, wherein the means for designating a location includes
a stylus movable to a stylus location;
means, responsive to a distance of the stylus location from a first reference location, for generating a first signal;
means, responsive to another distance of the stylus location from a second reference location, for generating a second signal; and
means, responsive to the first and second signals, for generating a signal representing a location of the stylus.

28. A system for processing documents, the system comprising:
means for receiving a stack of documents;
means for scanning a document;
means for transporting each document from the receiving means to the scanning means; and
means for stopping the transporting means and designating a location on a document while the document is the receiving means.

29. The system according to claim 28, wherein the transporting means includes means for transporting a top-most one of the documents.

30. A system according to claim 28, further including means for entering commands defining an operation to be performed on an image of the document.

31. A system according to claim 28, further including electrophotographic printing means, responsive to the scanning means.

* * * * *